United States Patent
Lu et al.

(10) Patent No.: US 12,141,056 B2
(45) Date of Patent: Nov. 12, 2024

(54) MNEMONIC PHRASE MANAGEMENT METHOD AND APPARATUS

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 18/283,901

(22) PCT Filed: Apr. 22, 2022

(86) PCT No.: PCT/CN2022/088588
§ 371 (c)(1),
(2) Date: Sep. 25, 2023

(87) PCT Pub. No.: WO2023/273549
PCT Pub. Date: Jan. 5, 2023

(65) Prior Publication Data
US 2024/0168875 A1    May 23, 2024

(30) Foreign Application Priority Data
Jun. 30, 2021  (CN) .......................... 202110735923.1

(51) Int. Cl.
*G06F 12/02* (2006.01)
*G06F 7/58* (2006.01)

(52) U.S. Cl.
CPC .......... *G06F 12/0238* (2013.01); *G06F 7/588* (2013.01)

(58) Field of Classification Search
CPC .. G06F 12/1009; G06F 3/0611; G06F 3/0656; G06F 3/0679; G06F 9/5016;
(Continued)

(56) References Cited

U.S. PATENT DOCUMENTS 11,003,697 B2 *  5/2021  Tran .................... G06F 16/1734
2015/0317390 A1 * 11/2015  Mills ....................... G06F 16/35
707/777

(Continued)

*Primary Examiner* — Sean D Rossiter
(74) *Attorney, Agent, or Firm* — Hammer & Associates, P.C.

(57) ABSTRACT

A mnemonic phrase management method. The method comprises: generating a random number having a first preset length and performing calculation on the random number; splicing the random number and data having a second preset length acquired from the random number calculation result to obtain a first spliced value; grouping the first spliced value according to a third preset length; sequentially searching an offset storage area for corresponding indexes according to values of the groups; obtaining mnemonic phrase starting offset addresses and mnemonic phrase lengths according to the indexes; and acquiring corresponding mnemonic phrases from a mnemonic phrase storage area according to the mnemonic phrase starting offset addresses and the mnemonic phrase lengths and sequentially storing the mnemonic phrases into a mnemonic phrase buffer. The present invention relates to the field of information security. Compared with the prior art, the present invention can greatly reduce storage space, solve the problem of space limitation of a security chip, and save more space for applications, is applicable to existing security chips, and meets production requirements of hardware devices.

7 Claims, 4 Drawing Sheets

(58) Field of Classification Search
CPC ......... G06F 12/1027; G06F 2212/7201; G06F 2212/7202; G06F 3/061; G06F 3/0625; G06F 3/0649; G06F 3/068; G06F 12/0246; G06F 9/5077; G06F 9/45558; G06F 3/0626; Y02D 10/00
See application file for complete search history.

(56) References Cited

U.S. PATENT DOCUMENTS

| | | | |
|---|---|---|---|
| 2020/0226586 A1* | 7/2020 | Lu | G06Q 20/3821 |
| 2020/0242230 A1* | 7/2020 | Bell | G06F 21/45 |
| 2021/0365487 A1 | 11/2021 | Chen et al. | |
| 2021/0409213 A1* | 12/2021 | Lu | H04L 9/0897 |
| 2022/0337392 A1* | 10/2022 | Schauer | H04L 9/3247 |
| 2023/0053891 A1* | 2/2023 | Kim | H04L 9/50 |
| 2024/0250834 A1* | 7/2024 | Stavetski | H04L 9/0869 |
| 2024/0283645 A1* | 8/2024 | Lavine | H04L 9/0825 |

\* cited by examiner

MNEMONIC PHRASE MANAGEMENT METHOD AND APPARATUS

TECHNICAL FIELD

The present invention relates to a method for managing a mnemonic word/phrase and apparatus therefor, which belongs to information security technology field.

BACKGROUND

Some hardware device generates a mnemonic word or a mnemonic phase at the time of initial configuring. The mnemonic word is used to generate private key. The private key can be used for authorizing digital asset management, etc. Meanwhile, the mnemonic word is backup of the private key. Therefore, when a hardware device is lost or damaged, the private key can be restored by using the mnemonic word. It is obvious that the security of mnemonic word links with security of the hardware device closely.

In the prior art, for different languages, the mnemonic words are made up of different words. The mnemonic word of each language is constituted by 2048 words; in a 32-bit chip, the mnemonic word is generally stored in form of array. For example, for 2048 English mnemonic words, address space of each mnemonic word is 4 bytes, the address space of 2048 English mnemonic words is: 4 bytes*2048=8K, space of all letters of 2048 English mnemonic words is: 11068Byte=10.81K, end identifier, i.e. '\0', of each English mnemonic word occupies space of 1 byte, the total address space require by the end identifiers of 2048 mnemonic words is: 2048*1 byte=2K, therefore, the total space required by the English mnemonic words is about 20.81K; more space is required while storage space of the present security chip is small and the requirement of manufacture of hardware device cannot be meet. Therefore, a solution for storing mnemonic words, i.e. a mnemonic phrase, with a small space is needed urgently.

SUMMARY OF THE INVENTION

The object of the present invention is to provide a method for managing a mnemonic word (or a mnemonic phrase) an apparatus therefor, which saves more storage space, solves problem caused by limited space of a secure chip and saves more space to the application, adapts to the present security chip and meets requirement of manufacturing hardware device.

According a first aspect of the present invention, there is provided a method for managing a mnemonic word (or a mnemonic phrase), which includes:
  Step S0, generate a random number with a first preset length and perform computation on the random number,
  Step S1, acquire data with a second preset length from result of performing computation on the random number, concatenate the random number and the acquired data to obtain a first concatenated value;
  Step S2, divide the first concatenated value into groups according to a third preset length;
  Step S3, take the first group as current group;
  Step S4, search for start offset address of a current mnemonic word in an offset storage area according to value of the current group, perform a computation so as to obtain a length of the current mnemonic word;
  Step S5, acquire a corresponding mnemonic word according to the start offset address of the current mnemonic word and the length of the current mnemonic word and store the acquired mnemonic word in mnemonic word buffer orderly;
  Step S6, determine whether group dividing is completed, if yes, end procedure, otherwise, take next group as current group, go back to Step S4.

Preferably, performing the computation on the random number includes: performing a hash operation on the random number.

Preferably, Step S4 includes: searching for start offset address of a current mnemonic word in an offset storage area according to a value of the current group, acquire start offset address of next mnemonic word from next adjacent position in the offset storage area, obtain a length of the current mnemonic word according to start offset address of next mnemonic word and the start offset address of the current mnemonic word.

Preferably, obtaining the length of the current mnemonic word according to start offset address of next mnemonic word and the start offset address of the current mnemonic word specifically is: performing operation that the obtained start offset address of next mnemonic word minus the start offset address of the current mnemonic word to obtain length of the current mnemonic word.

Preferably, when determining that group dividing is completed in Step S6, the method further includes: performing hash operation on all mnemonic words in the mnemonic word buffer to obtain a seed and store the seed.

Preferably, performing the hash operation on all mnemonic words in the mnemonic word buffer to obtain a seed and storing the seed specifically includes: performing hash operation on all mnemonic words in the mnemonic word buffer for 2048 times to obtain the seed and store the seed.

According to a second aspect of the present invention, there is provided an apparatus of managing mnemonic word (i.e. a mnemonic phrase), which includes:
  a generating and computing module configured to generate a random number with a first preset length and perform computation on the random number;
  an acquiring and concatenating module configured to acquire data with a second preset length from result of performing computation on the random number, concatenate the random number and the acquired data to obtain a first concatenated value;
  a dividing and determining module configured to divide the first concatenated value into groups according to a third preset length;
  a first taking module is configured to take the first group as current group;
  a searching and obtaining module configured to search for start offset address of a current mnemonic word in an offset storage area according to value of the current group, perform computation to obtain length of the current mnemonic word;
  a storing module configured to acquire a corresponding mnemonic word from mnemonic storage area according to the start offset address of the current mnemonic word and the length of the current mnemonic word and store the acquired mnemonic word in mnemonic word buffer orderly; and
  a first determining module configured to determine whether group dividing is completed, if yes, end procedure, otherwise, trigger the searching and obtaining module.

According to a third aspect of the present invention, there is provided an apparatus of managing a mnemonic word (i.e. a mnemonic phrase); the apparatus includes at least one processor, storage and at least one processor executable instruction stored in the storage, the at least one processor executes the computer executable instruction to implement the method for managing mnemonic word of the present invention.

According to a fourth aspect of the present invention, there is provided a computer readable storage medium, the computer readable storage medium includes a computer program, when the computer program runs on an apparatus to enable the apparatus to perform the method of managing mnemonic word of the present invention.

According to a fifth aspect, there is provided a chip, the chip is coupled to the storage and is configured to execute computer program stored in the storage to implement the method of managing mnemonic word of the present invention.

According to the present invention, a start offset address of a mnemonic word (i.e. a mnemonic phrase) is acquired from the offset storage area by indexing, a corresponding mnemonic word is found from the mnemonic word storage area according to the start offset address of the mnemonic word, each mnemonic word is store orderly in the mnemonic word storage area, which deletes end identifier of each mnemonic word in the prior art, and the space for storing the start offset address of the mnemonic word in the offset storage area is less than the space of that in prior art.

Compared to the prior art, the technical solution of the present invention can save the storage space greatly, solve the problem of limited security chip space, save more space for application, and be also adapted to security chip in prior art and satisfy manufacturing requirement of hardware device.

PREFERRED EMBODIMENTS

Figure 1:
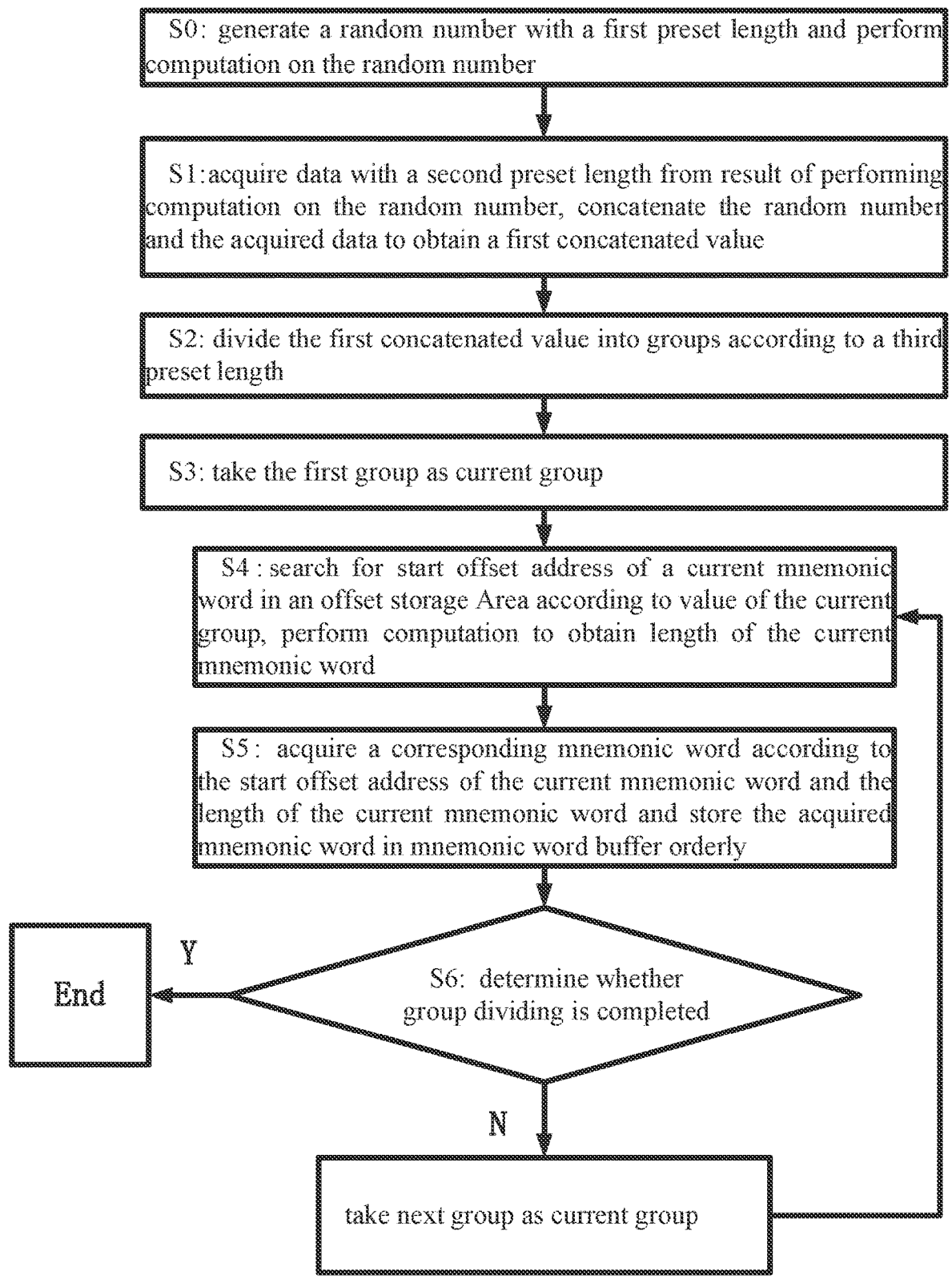
FIG. 1 is a flow chart of a method for managing mnemonic word provided by Embodiment 1 of the present invention.

The present disclosure provides a method for managing mnemonic phrase and apparatus thereof. Reference will now be made in detail embodiments of the disclosure examples of which are illustrated in the accompanying drawings. The embodiments referring the drawing are examples of the present disclosure and are used to explain the present disclosure. However, it should be understood that the present disclosure is not limited to those specific embodiments.

Unless defined otherwise herein, all technical and scientific terms used herein have the same meaning as commonly understood by one of ordinary skill in the art to which this invention belongs. Terms defined in a general dictionary may be interpreted with the same or similar meaning as the meaning in the context of the related art and are not to be interpreted to have ideal or excessively formal meanings unless clearly defined in the present disclosure.

In order to make the purpose of this disclosure, technical solution and advantage are more clearly understood, below in conjunction with attached drawing and implementation Examples, the present disclosure will be further described in detail.

Embodiment 1

Embodiment 1 of the present invention provides a method for managing a mnemonic word (i.e. a mnemonic phrase). As shown in FIG. 1, the method includes:

Step S0, generate a random number with a first preset length and perform computation on the random number;

Step S1, acquire data with a second preset length from result of performing computation on the random number, concatenate the random number and the acquired data to obtain a first concatenated value;

Specifically, in Embodiment 1, performing computation on the random number includes: performing hash operation on the random number;

Step S2, divide the first concatenated value into groups according to a third preset length;

Step S3, take the first group as current group;

Step S4, search for a start offset address of a current mnemonic word in an offset storage area according to value of the current group, perform computation to obtain length of the current mnemonic word;

Specifically, in Embodiment 1, Step S4 includes: search for start offset address of a current mnemonic word in an offset storage area according to value of the current group, acquire start offset address of next mnemonic word from next adjacent position in the offset storage area, obtain length of the current mnemonic word according to start offset address of next mnemonic word and the start offset address of the current mnemonic word;

Further, obtaining length of the current mnemonic word according to start offset address of next mnemonic word and the start offset address of the current mnemonic word specifically is: performing operation that the obtained start offset address of next mnemonic word minus the start offset address of the current mnemonic word, so as to obtain a length of the current mnemonic word;

Step S5, acquire a corresponding mnemonic word according to the start offset address of the current mnemonic word and the length of the current mnemonic word and store the acquired mnemonic word in mnemonic word buffer orderly;

Step S6, determine whether group dividing is completed, if yes, end procedure, otherwise, take next group as current group, go back to Step S4.

Preferably, in Embodiment 1, when determining that group dividing is completed in Step S6, the method further includes: performing hash operation on all mnemonic words in the mnemonic word buffer so as to obtain a seed and store the seed; more specifically, performing hash operation on all mnemonic words in the mnemonic word buffer for 2048 times to obtain the seed and store the seed.

Embodiment 2

Figure 2:
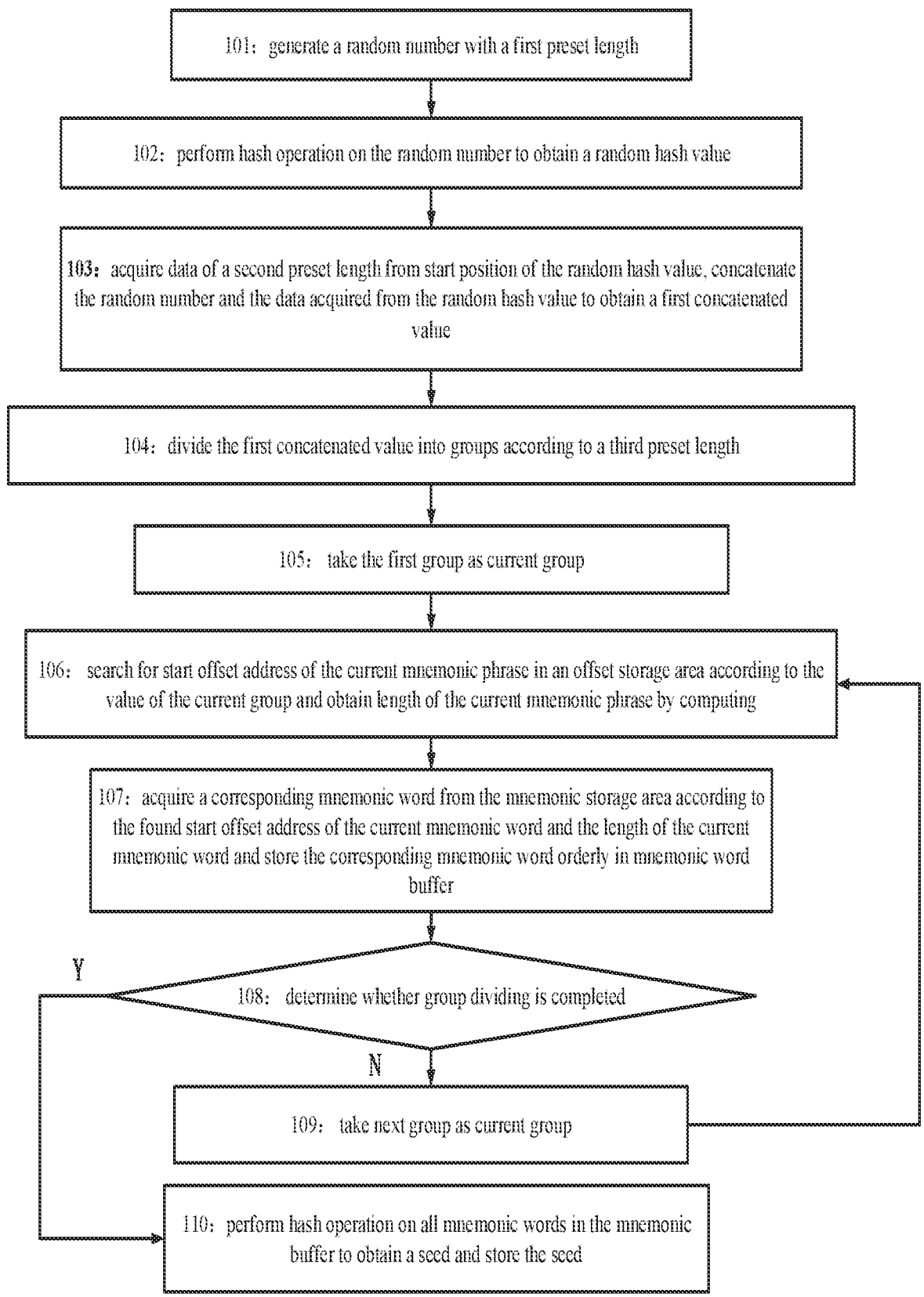
FIG. 2 is a flow chart of a method for managing mnemonic word provided by Embodiment 2 of the present invention.
Figure 3:
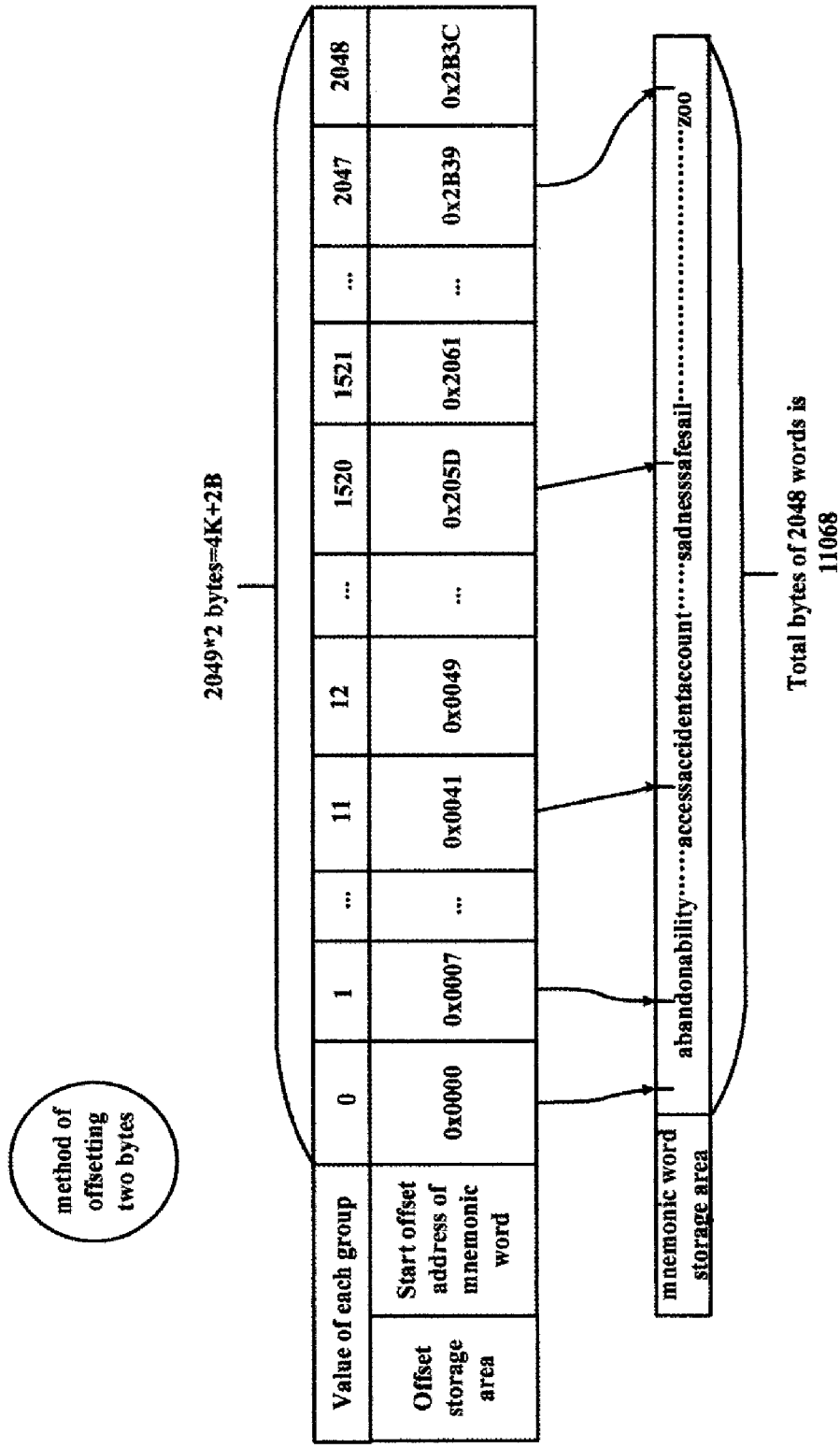
FIG. 3 is a structural diagram of an offset storage area and a mnemonic word storage area in Embodiment 2 of the present invention.

Embodiment 2 of the present invention provides a method for managing mnemonic word (i.e. a mnemonic phrase). As shown in FIG. 2, the method includes:

Step 101, generate a random number with a first preset length;
For example, the first preset length of Embodiment 2 is 16 bytes, the generated random number is:
10111110000000000101111000100101001001000001110111110111101001001111111101010100001000101111100000011100110000010110100001101;
Step 102, perform a hash operation on the random number to obtain a random number hash value;
Specifically, in Embodiment 2, perform hash operation, i.e. SHA256, on the random number to obtain the random number hash value;
For example, the obtained random number hash value of Embodiment 2 is:
0101001110001000011100001100000000011111100000010011100101110111101001101101000001010011111100000001000000000101101101011001010111000101011010011111011101111011010111110100001101111100100110010101011010111010010100001010110011110010100011000000100010110011001;
Step 103, acquire data of a second preset length from start position of the random number hash value, concatenate the random number and the data acquired from the random number hash value to obtain a first concatenated value;
In Embodiment 2, the second preset length is obtained according to the length of random number, specifically, bit length of the random number divided by 32 to obtain the second preset length. For example, the second preset length of the Embodiment 2 is 16*8/32=4; the data acquired from the random number hash value is 0101, the obtained first concatenated value is
10111100000000000101111000100101001001000001110111110111101001001111111101010101000010001011110000011100110000010110100001110101;
Step 104, divide the first concatenated value into groups according to a third preset length;
For example, the third preset length is 11 bits in Embodiment 2,
A result of dividing the first concatenated value is as the following:
INDEX0:10111110000⇒1520
INDEX1:00000001011⇒11
INDEX2:11000100101⇒1573
INDEX3:00100100000⇒288
INDEX4:11101111101⇒1917
INDEX5:11101001001⇒1865
INDEX6:11111110101⇒2037
INDEX7:01010000100⇒644
INDEX8:01011111000⇒760
INDEX9:00111001100⇒460
INDEX10:00010110100⇒180
INDEX11:00111010101⇒469
Step 105, take the first group as current group;
For example, the current group is: INDEX0: 10111110000;
Step 106, search for start offset address of the current mnemonic word in an offset storage area according to the value of the current group and obtain length of the current mnemonic word by computing;
In Embodiment 2, Step 106 includes: searching for a start offset address of the current mnemonic word in an offset storage area according to the value of the current group, acquiring start offset address of the next mnemonic word from the next adjacent position in the offset storage area, acquiring length of the current mnemonic word according to the start offset address of the acquired next mnemonic word and the start offset address of the current mnemonic word;
In this case, acquiring the length of the current mnemonic word according to the start offset address of the acquired next mnemonic word and the start offset address of the current mnemonic word specifically is: acquiring length of the current mnemonic word by operation that the start offset address of the acquired next mnemonic word minus the start offset address of the current mnemonic word;
As shown in FIG. 3, in Embodiment 2, storing start offset address of every mnemonic word in the offset storage area, storing mnemonic words orderly in a mnemonic word storage area, start offset addresses of adjacent mnemonic words are stored adjacently, the length of mnemonic word can be acquired according to two adjacent start offset addresses in the offset storage area, an initial letter of a corresponding mnemonic word can be found in the mnemonic storage area according to the start offset address of the mnemonic word in the offset storage area, a corresponding word can be acquired by acquiring data of length of mnemonic word from the initial letter in the mnemonic storage area. For example, in Embodiment 2, convert the first group 10111110000 to get decimal data 1520, acquire the start offset address, i.e. 0x205D, of the mnemonic word at the position of which sequence number is 1520 in the offset storage area; it should be noted that the sequence number in the offset storage area starts from 0; acquire the start offset address, i.e. 0x2061, of the next mnemonic word from next position, i.e. 1521, in the offset storage area, obtain the length of the current mnemonic word, i.e., 0x2061−0x205D=4, according to the acquired start offset address of the two mnemonic word;
Step 107, acquire a corresponding mnemonic word from the mnemonic storage area according to the found start offset address of the current mnemonic word and the length of the current mnemonic word and store the corresponding mnemonic word orderly in mnemonic word buffer;
For example, find the position of the offset address 0x205D in the mnemonic storage area, read data of 4 bytes from the found position to acquire mnemonic word, i.e. safe;
Step 108, determine whether group dividing is completed, if yes, execute Step 110; otherwise, execute Step 109;
Step 109, take next group as current group, go back to Step 106;
Step 110, perform hash operation on all mnemonic words in the mnemonic buffer to obtain a seed and store the seed;
Specifically, in Embodiment 2, Step 110 includes: perform SHA512 hash operation 2048 times on all mnemonic words in the mnemonic buffer to obtain a seed and store the seed.
For example, in Embodiment 2, all mnemonic words in the mnemonic buffer are: safe accident seven catch use truck wrong explain gallery define bird deny.
The method of managing a mnemonic word provided in Embodiment 2 is adapted to English mnemonic word. In the method, the original mnemonic words are connected in an end to end way, end identifier '\0' of each mnemonic word is deleted; total space, i.e. mnemonic word storage area, required for all letters of the 2048 English mnemonic words is: 11068Byte=10.81K, which is 2K less than the space in prior art; the start offset address of each mnemonic word is stored by using array of 2 bytes; store the start offset addresses of 2048 English mnemonic words and a start offset address obtained by adding the length of the last mnemonic word and the start offset address of the last mnemonic word, the total space, i.e. the offset storage, required is 2049*2≈4K, which is 4K less than the space, i.e. 8K, required in prior art. In the method of Embodiment 2, the space required for storing the mnemonic words is: 10.81K+ 4K≈14.81K; for, total number of letters of the mnemonic word is 26, each letter can be represented by 5 bits, therefore, 11068−11068*5/8=4.05K is saved. According to mentioned above, the storage space, i.e. 2+4+4.05≈10.05K, is saved. Compared with the storage space in prior art, 50% of the storage space is saved.

The method for managing a mnemonic word provided in Embodiment 2 of the present invention solves problem caused by limited space of a secure chip, which can save more space for application. The method adapts to the present security chip and meets requirement of manufacturing hardware device.

Figure 4:
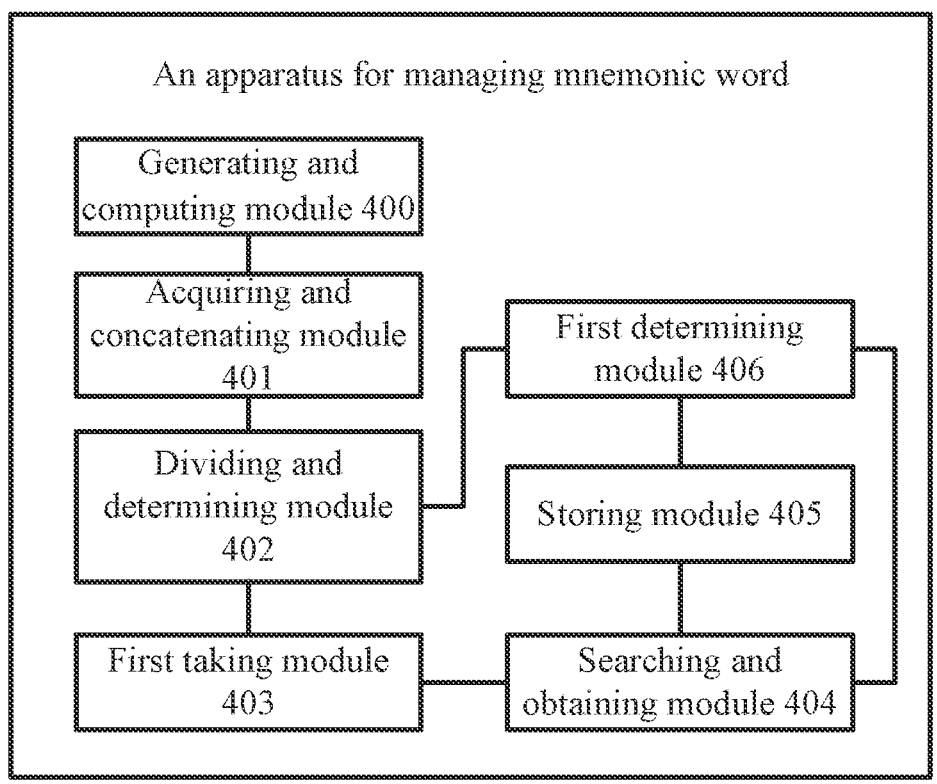
FIG. 4 is a block diagram of apparatus of managing mnemonic word provided by Embodiment 2 of the present invention.

Preferably, an apparatus for managing a mnemonic word (i.e. a mnemonic phrase) is provided in Embodiment 2. As shown in FIG. 4, the apparatus includes:
- a generating and computing module 400 configured to generate a random number with a first preset length and perform computation on the random number;
- an acquiring and concatenating module 401 configured to acquire data with a second preset length from result of performing computation on the random number, concatenate the random number and the acquired data to obtain a first concatenated value;
- a dividing and determining module 402 configured to divide the first concatenated value into groups according to a third preset length;
- a first taking module 403 configured to take the first group as current group;
- a searching and obtaining module 404 configured to search for start offset address of a current mnemonic word in an offset storage area according to value of the current group, perform computation to obtain length of the current mnemonic word;
- a storing module 405 configured to acquire a corresponding mnemonic word from mnemonic storage area according to the start offset address of the current mnemonic word and the length of the current mnemonic word and store the acquired mnemonic word in mnemonic word buffer orderly;
- a first determining module 406 configured to determine whether group dividing is completed, if yes, end procedure, otherwise, trigger the searching and obtaining module 404.

In Embodiment 2, the generating and computing module 400 specifically is configured to generate a random number with a first preset length, and perform a hash operation on the random number.

In Embodiment 2, the searching and obtaining module 404 includes:
- a searching and acquiring unit configured to search for start offset address of a current mnemonic word in an offset storage area according to value of the current group, acquire start offset address of next mnemonic word from next adjacent position in the offset storage area; and
- a computing and obtaining unit configured to obtain length of the current mnemonic word according to start offset address of next mnemonic word and the start offset address of the current mnemonic word.

Further, the computing and obtaining unit is specifically configured to perform operation that the obtained start offset address of next mnemonic word minus the start offset address of the current mnemonic word to obtain length of the current mnemonic word.

Preferably, the apparatus of Embodiment 2 further includes a computing and storing module configured to, if determining result of the first determining module 406 is yes, perform hash operation on all mnemonic words in the mnemonic word buffer to obtain a seed and store the seed.

Further, the computing and storing module specifically is configured to perform hash operation on all mnemonic words in the mnemonic word buffer for 2048 times to obtain the seed and store the seed.

Preferably, Embodiment 2 further provides an apparatus of managing a mnemonic word. The apparatus includes at least one processor, a storage and at least one processor executable instruction stored in the storage, the at least one processor executes the computer executable instruction to implement the method for managing mnemonic word of Embodiment 2. When the apparatus is a chip system, the apparatus may be constituted by a chip, or include a chip and other separated elements, which is not limited by Embodiment 2; the chip is coupled to the storage and is configured to execute computer program stored in the storage to implement the method of managing a mnemonic word disclosed in Embodiment 2.

The Embodiment 2 described above may be implemented by using software, hardware, firmware, or any combination thereof. When a software program is used to implement the Embodiment 2, the Embodiment 2 may be implemented completely or partially in a form of a computer program product. The computer program product includes one or more computer program instructions. When the computer program instructions are loaded and executed on a computer, the procedures or functions according to the Embodiment 2 of this application are all or partially generated. The computer instructions may be stored in a computer-readable storage medium or may be transmitted from a computer-readable storage medium to another computer-readable storage medium. For example, the computer instructions may be transmitted from a base station, apparatus, server, or data center to another base station, apparatus, server, or data center in a wired (for example, a coaxial cable, an optical fiber, or DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like. In the Embodiment of the present disclosure, the apparatus may include the foregoing apparatus described.

Although the application is described with reference to the embodiments, in a procedure of implementing the application that claims protection, one of ordinary skill in the art may understand and implement another variation of the disclosed embodiments by viewing the accompanying drawings, disclosed content, and the appended claims. In the claims, "comprise" (comprising) does not exclude another component or another operation, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although the application is described with reference to features and the embodiments thereof, it is clear that various modifications and combinations may be made to them without departing from the spirit and scope of the application. Correspondingly, the specification and accompanying drawings are merely example description of the application defined by the appended claims, and is considered as any of or all modifications, variations, combinations or equivalents that cover the scope of the application. It is clear that one of ordinary skill in the art can make various modifications and variations to the application without departing from the spirit and scope of the application. The application is intended to cover these modifications and variations of the invention, provided that they fall within the scope of protection defined by the appended claims and their equivalent technologies.

The invention claimed is:

1. A method for managing a mnemonic word, comprising the following steps:
    S0) generating a random number with a first preset length, and performing computation on the random number;
    S1) acquiring data with a second preset length from a result of performing the computation on the random number, and concatenating the random number and the acquired data, so as to obtain a first concatenated value;
    S2) dividing the first concatenated value into groups according to a third preset length;
    S3) taking a first group as a current group;
    S4) searching for a start offset address of a current mnemonic word in an offset storage area according to a value of the current group, and performing another computation to obtain a length of the current mnemonic word;
    S5) acquiring a corresponding mnemonic word according to the start offset address of the current mnemonic word and the length of the current mnemonic word, and storing the corresponding mnemonic word in a mnemonic word buffer orderly; and
    S6) determining whether group dividing is completed, if yes, ending, otherwise, taking a next group as the current group, then going back to Step S4.

2. The method of claim 1, wherein performing a computation on the random number comprises: performing a hash operation on the random number.

3. The method of claim 1, wherein Step S4 comprises: searching for the start offset address of a current mnemonic word in an offset storage area according to the value of the current group, acquiring the start offset address of a next mnemonic word from a next adjacent position in the offset storage area, obtaining the length of the current mnemonic word according to the start offset address of the next mnemonic word and the start offset address of the current mnemonic word.

4. The method of claim 3, wherein obtaining the length of the current mnemonic word according to the start offset address of the next mnemonic word and the start offset address of the current mnemonic word specifically is: performing an operation that the start offset address of the next mnemonic word minus the start offset address of the current mnemonic word, so as to obtain the length of the current mnemonic word.

5. The method of claim 1, wherein when determining that group dividing is completed in Step S6, the method further comprises: performing the hash operation on all mnemonic words in the mnemonic word buffer, so as to obtain a seed and store the seed.

6. The method of claim 5, wherein performing the hash operation on all mnemonic words in the mnemonic word buffer so as to obtain a seed and storing the seed comprises: performing the hash operation on all mnemonic words in the mnemonic word buffer for 2048 times, so as to obtain the seed and storing the seed.

7. An apparatus for managing a mnemonic word comprising:
    at least one processor, which comprises
        a generating and computing module configured to generate a random number with a first preset length, and to perform a hash operation on the random number;
        an acquiring and concatenating module configured to acquire data with a second preset length from a result of performing computation on the random number, to concatenate the random number and the acquired data to obtain a first concatenated value;
        a dividing and determining module configured to divide the first concatenated value into groups according to a third preset length;
        a first taking module configured to take the first group as a current group;
        a searching and obtaining module configured to search for a start offset address of a current mnemonic word in an offset storage area according to a value of the current group, to perform computation to obtain length of the current mnemonic word;
    a storage media which comprises
        a storing module configured to acquire a corresponding mnemonic word from a mnemonic storage area according to the start offset address and length of the current mnemonic word, store the acquired mnemonic word in a mnemonic word buffer orderly, and to send a signal the to a first determining module; and
    the first determining module configured to determine whether group dividing is completed, if yes, to end procedure, otherwise, to trigger the searching and obtaining module.

* * * * *